United States Patent
Sarwar et al.

(10) Patent No.: US 12,475,696 B2
(45) Date of Patent: Nov. 18, 2025

(54) PERSONALIZED ONLINE LEARNING FOR ARTIFICIAL REALITY APPLICATIONS

(71) Applicant: META PLATFORMS TECHNOLOGIES, LLC, Menlo Park, CA (US)

(72) Inventors: Syed Shakib Sarwar, Bellevue, WA (US); Manan Suri, New Delhi (IN); Vivek Kamalkant Parmar, Vadodara (IN); Ziyun Li, Redmond, WA (US); Barbara De Salvo, Belmont, WA (US); Hsien-Hsin Sean Lee, Cambridge, MA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 899 days.

(21) Appl. No.: 17/707,149

(22) Filed: Mar. 29, 2022

(65) Prior Publication Data

US 2023/0260268 A1 Aug. 17, 2023

(30) Foreign Application Priority Data

Feb. 11, 2022 (IN) .............................. 202241007310

(51) Int. Cl.
*G06V 10/82* (2022.01)
*G06F 3/01* (2006.01)
(Continued)

(52) U.S. Cl.
CPC .............. *G06V 10/82* (2022.01); *G06F 3/013* (2013.01); *G06T 7/80* (2017.01); *G06T 19/006* (2013.01);
(Continued)

(58) Field of Classification Search
None
See application file for complete search history.

(56) References Cited

U.S. PATENT DOCUMENTS

| 2019/0038964 A1 | 2/2019 | Veeramani et al. |
| 2020/0151611 A1 | 5/2020 | McGavran et al. |

(Continued)

FOREIGN PATENT DOCUMENTS

| CN | 113963237 A | * | 1/2022 | |
| CN | 111062263 B | * | 11/2023 | ............ G06F 18/241 |
| TW | 202029054 A | * | 8/2020 | .............. F02K 1/006 |

*Primary Examiner* — Fan Zhang
(74) *Attorney, Agent, or Firm* — Morgan, Lewis & Bockius LLP

(57) ABSTRACT

A console and headset system locally trains machine learning models to perform customized online learning tasks. To customize the online learning models for specific users of the system without using outside resources, the system trains the models to compare a target frame to stored calibration frames, rather than directly inferring information about a target frame. During deployment, an embedding is generated for the target frame. A sample embedding that is closest to the target embedding is selected from a group of embeddings of calibration frames. The information about the selected embedding and target embedding and ground truths for the calibration frame are provided as inputs to one of the trained models. The model predicts a difference between the target frame and the calibration frame, which can be used to determine information about the target frame.

20 Claims, 10 Drawing Sheets

(51) Int. Cl.
*G06T 7/80* (2017.01)
*G06T 19/00* (2011.01)
*G06V 10/764* (2022.01)
*G06V 40/10* (2022.01)
*G06V 40/16* (2022.01)

(52) U.S. Cl.
CPC ............ *G06V 10/764* (2022.01); *G06V 40/11* (2022.01); *G06V 40/161* (2022.01); *G06T 2207/20081* (2013.01); *G06T 2207/20084* (2013.01)

(56) References Cited

U.S. PATENT DOCUMENTS

| | | |
|---|---|---|
| 2021/0117859 A1 | 4/2021 | Rogers et al. |
| 2021/0166077 A1 | 6/2021 | Yu et al. |
| 2021/0232981 A1 | 7/2021 | Sundaresan |

\* cited by examiner

PERSONALIZED ONLINE LEARNING FOR ARTIFICIAL REALITY APPLICATIONS

CROSS REFERENCE TO RELATED APPLICATIONS

This application claims the benefit of Indian Application No. 202241007310, filed Feb. 11, 2022, which is incorporated by reference in its entirety.

FIELD OF THE INVENTION

This disclosure relates generally to artificial reality applications, and more specifically to personalized online learning for artificial reality systems.

BACKGROUND

A system, such as a headset and console system, that uses virtual reality, augmented reality, and/or mixed reality can have multiple users. For example, several people in one household may use the headset at different times for different purposes. The headset system uses machine learning models to produce information for the users and to gain insight about the way a user is interacting within the environment. These machine learning models can be highly complex and require a large amount of time, processing power, and training data to train and update a model. This makes user customization problematic, because the headset system may not have the resources needed to train a model for each user of the system and user variation can mean that not all users match well with a standard model.

SUMMARY

A headset and console system stores embeddings of calibration frames that can be used to efficiently train and update models to provide user customization for various tasks, such as object tracking. The system begins with a pretrained model that is not customized to a particular user (or alternatively a model with random model weights) and trains the machine learning model to predict information for each user using locally stored embeddings of calibration frames for the user. The machine learning models are trained to predict differences between stored calibration frames and target frames, rather than predicting information about target frames directly. This pipeline allows the system to train the model using a similarity search between embeddings target frames and stored embeddings of calibration frames and thus reduces the amount of processing power, training time, and training inputs that are needed to customize a model for a user.

To deploy the trained machine learning models and make a prediction about a target image frame, the system generates a target feature embedding that represents the target frame. The system then identifies a sample embedding, that is, a stored embedding of one of the calibration frames for the current user, that is closest to the embedding for the target frame. The system then also accesses ground truth information about the calibration frame that is associated with the sample embedding. A combined embedding that is a combination of the target embedding and the sample embedding is generated as an input for the model. For example, the combined embedding may be an embedding that represents the difference between the target embedding and the sample embedding. The combined embedding, the target embedding, and the ground truth data are provided to the model as inputs. The model predicts a difference between an attribute of the calibration frame and the same attribute in the target frame. This difference prediction can be used to generate a prediction about the attribute in the target frame.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

A console and headset system locally trains machine learning models to perform customized tasks such as object tracking. To customize the models for specific users of the system without using outside resources, the system trains the models to compare a target frame to stored calibration frames, rather than directly inferring information about a target frame. During deployment, an embedding is generated for the target frame. A sample embedding that is closest to the target embedding is selected from a group of embeddings of calibration frames. The information about the selected embedding and target embedding and ground truths for the calibration frame are provided as inputs to one of the trained models. The model predicts a difference between the target frame and the calibration frame, which can be used to determine information for the target frame.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to create content in an artificial reality and/or are otherwise used in an artificial reality. The artificial reality system that provides the artificial reality content may be implemented on various platforms, including a wearable device (e.g., headset) connected to a host computer system, a standalone wearable device (e.g., headset), a mobile device or computing system, or any other hardware platform capable of providing artificial reality content to one or more viewers.

Figure 1A:
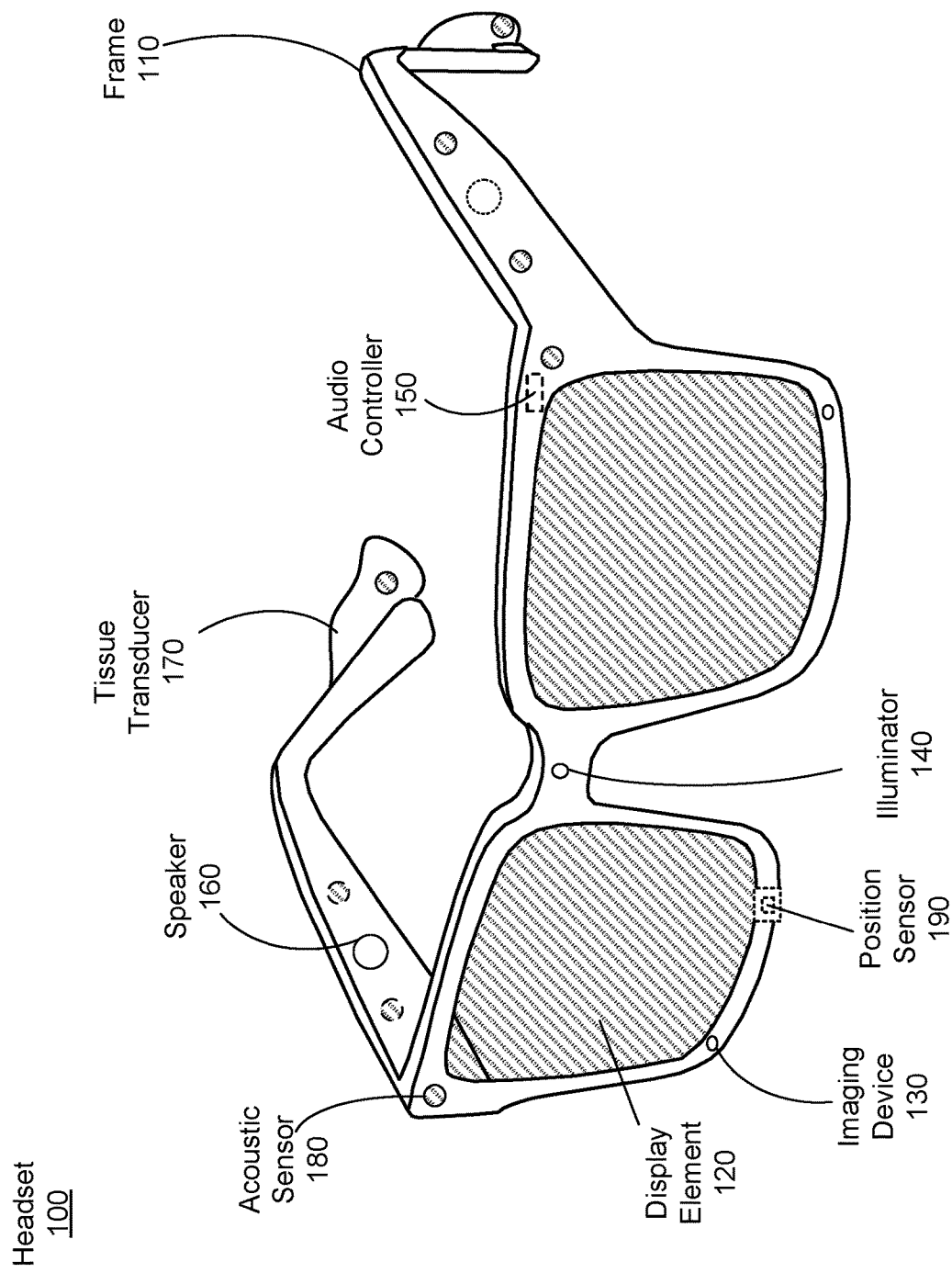
FIG. 1A is a perspective view of a headset implemented as an eyewear device, in accordance with one or more embodiments.

FIG. 1A is a perspective view of a headset 100 implemented as an eyewear device, in accordance with one or more embodiments. In some embodiments, the eyewear device is a near eye display (NED). In general, the headset 100 may be worn on the face of a user such that content (e.g., media content) is presented using a display assembly and/or an audio system. However, the headset 100 may also be used such that media content is presented to a user in a different manner. Examples of media content presented by the headset 100 include one or more images, video, audio, or some combination thereof. The headset 100 includes a frame, and may include, among other components, a display assembly including one or more display elements 120, a depth camera assembly (DCA), an audio system, and a position sensor 190. While FIG. 1A illustrates the components of the headset 100 in example locations on the headset 100, the components may be located elsewhere on the headset 100, on a peripheral device paired with the headset 100, or some combination thereof. Similarly, there may be more or fewer components on the headset 100 than what is shown in FIG. 1A.

The frame 110 holds the other components of the headset 100. The frame 110 includes a front part that holds the one or more display elements 120 and end pieces (e.g., temples) to attach to a head of the user. The front part of the frame 110 bridges the top of a nose of the user. The length of the end pieces may be adjustable (e.g., adjustable temple length) to fit different users. The end pieces may also include a portion that curls behind the ear of the user (e.g., temple tip, ear piece).

The one or more display elements 120 provide light to a user wearing the headset 100. As illustrated the headset includes a display element 120 for each eye of a user. In some embodiments, a display element 120 generates image light that is provided to an eyebox of the headset 100. The eyebox is a location in space that an eye of user occupies while wearing the headset 100. For example, a display element 120 may be a waveguide display. A waveguide display includes a light source (e.g., a two-dimensional source, one or more line sources, one or more point sources, etc.) and one or more waveguides. Light from the light source is in-coupled into the one or more waveguides which outputs the light in a manner such that there is pupil replication in an eyebox of the headset 100. In-coupling and/or outcoupling of light from the one or more waveguides may be done using one or more diffraction gratings. In some embodiments, the waveguide display includes a scanning element (e.g., waveguide, mirror, etc.) that scans light from the light source as it is in-coupled into the one or more waveguides. Note that in some embodiments, one or both of the display elements 120 are opaque and do not transmit light from a local area around the headset 100. The local area is the area surrounding the headset 100. For example, the local area may be a room that a user wearing the headset 100 is inside, or the user wearing the headset 100 may be outside and the local area is an outside area. In this context, the headset 100 generates VR content. Alternatively, in some embodiments, one or both of the display elements 120 are at least partially transparent, such that light from the local area may be combined with light from the one or more display elements to produce AR and/or MR content.

In some embodiments, a display element 120 does not generate image light, and instead is a lens that transmits light from the local area to the eyebox. For example, one or both of the display elements 120 may be a lens without correction (non-prescription) or a prescription lens (e.g., single vision, bifocal and trifocal, or progressive) to help correct for defects in a user's eyesight. In some embodiments, the display element 120 may be polarized and/or tinted to protect the user's eyes from the sun.

In some embodiments, the display element 120 may include an additional optics block (not shown). The optics block may include one or more optical elements (e.g., lens, Fresnel lens, etc.) that direct light from the display element 120 to the eyebox. The optics block may, e.g., correct for aberrations in some or all of the image content, magnify some or all of the image, or some combination thereof.

The DCA determines depth information for a portion of a local area surrounding the headset 100. The DCA includes one or more imaging devices 130 and a DCA controller (not shown in FIG. 1A), and may also include an illuminator 140. In some embodiments, the illuminator 140 illuminates a portion of the local area with light. The light may be, e.g., structured light (e.g., dot pattern, bars, etc.) in the infrared (IR), IR flash for time-of-flight, etc. In some embodiments, the one or more imaging devices 130 capture images of the portion of the local area that include the light from the illuminator 140. As illustrated, FIG. 1A shows a single illuminator 140 and two imaging devices 130. In alternate embodiments, there is no illuminator 140 and at least two imaging devices 130.

The DCA controller computes depth information for the portion of the local area using the captured images and one or more depth determination techniques. The depth determination technique may be, e.g., direct time-of-flight (ToF) depth sensing, indirect ToF depth sensing, structured light, passive stereo analysis, active stereo analysis (uses texture added to the scene by light from the illuminator 140), some other technique to determine depth of a scene, or some combination thereof.

The DCA may include an eye tracking unit that determines eye tracking information. The eye tracking information may comprise information about a position and an orientation of one or both eyes (within their respective eye-boxes). The eye tracking unit may include one or more cameras. The eye tracking unit estimates an angular orientation of one or both eyes based on images captures of one or both eyes by the one or more cameras. In some embodiments, the eye tracking unit may also include one or more illuminators that illuminate one or both eyes with an illumination pattern (e.g., structured light, glints, etc.). The eye tracking unit may use the illumination pattern in the captured images to determine the eye tracking information. In some embodiments, the eye tracking unit may use the online learning and object tracking techniques described herein to perform eye tracking processes. The headset 100 may prompt the user to opt in to allow operation of the eye tracking unit. For example, by opting in the headset 100 may detect, store, images of the user's any or eye tracking information of the user.

The audio system provides audio content. The audio system includes a transducer array, a sensor array, and an audio controller 150. However, in other embodiments, the audio system may include different and/or additional components. Similarly, in some cases, functionality described with reference to the components of the audio system can be distributed among the components in a different manner than is described here. For example, some or all of the functions of the controller may be performed by a remote server.

The transducer array presents sound to user. The transducer array includes a plurality of transducers. A transducer may be a speaker 160 or a tissue transducer 170 (e.g., a bone conduction transducer or a cartilage conduction transducer). Although the speakers 160 are shown exterior to the frame 110, the speakers 160 may be enclosed in the frame 110. In some embodiments, instead of individual speakers for each ear, the headset 100 includes a speaker array comprising multiple speakers integrated into the frame 110 to improve directionality of presented audio content. The tissue transducer 170 couples to the head of the user and directly vibrates tissue (e.g., bone or cartilage) of the user to generate sound. The number and/or locations of transducers may be different from what is shown in FIG. 1A.

The sensor array detects sounds within the local area of the headset 100. The sensor array includes a plurality of acoustic sensors 180. An acoustic sensor 180 captures sounds emitted from one or more sound sources in the local area (e.g., a room). Each acoustic sensor is configured to detect sound and convert the detected sound into an electronic format (analog or digital). The acoustic sensors 180 may be acoustic wave sensors, microphones, sound transducers, or similar sensors that are suitable for detecting sounds.

In some embodiments, one or more acoustic sensors 180 may be placed in an ear canal of each ear (e.g., acting as binaural microphones). In some embodiments, the acoustic sensors 180 may be placed on an exterior surface of the headset 100, placed on an interior surface of the headset 100, separate from the headset 100 (e.g., part of some other device), or some combination thereof. The number and/or locations of acoustic sensors 180 may be different from what is shown in FIG. 1A. For example, the number of acoustic detection locations may be increased to increase the amount of audio information collected and the sensitivity and/or accuracy of the information. The acoustic detection locations may be oriented such that the microphone is able to detect sounds in a wide range of directions surrounding the user wearing the headset 100.

The audio controller 150 processes information from the sensor array that describes sounds detected by the sensor array. The audio controller 150 may comprise a processor and a computer-readable storage medium. The audio controller 150 may be configured to generate direction of arrival (DOA) estimates, generate acoustic transfer functions (e.g., array transfer functions and/or head-related transfer functions), track the location of sound sources, form beams in the direction of sound sources, classify sound sources, generate sound filters for the speakers 160, or some combination thereof.

The position sensor 190 generates one or more measurement signals in response to motion of the headset 100. The position sensor 190 may be located on a portion of the frame 110 of the headset 100. The position sensor 190 may include an inertial measurement unit (IMU). Examples of position sensor 190 include: one or more accelerometers, one or more gyroscopes, one or more magnetometers, another suitable type of sensor that detects motion, a type of sensor used for error correction of the IMU, or some combination thereof. The position sensor 190 may be located external to the IMU, internal to the IMU, or some combination thereof.

In some embodiments, the headset 100 may provide for simultaneous localization and mapping (SLAM) for a position of the headset 100 and updating of a model of the local area. For example, the headset 100 may include a passive camera assembly (PCA) that generates color image data. The PCA may include one or more RGB cameras that capture images of some or all of the local area. In some embodiments, some or all of the imaging devices 130 of the DCA may also function as the PCA. The images captured by the PCA and the depth information determined by the DCA may be used to determine parameters of the local area, generate a model of the local area, update a model of the local area, or some combination thereof. Furthermore, the position sensor 190 tracks the position (e.g., location and pose) of the headset 100 within the room. Additional details regarding the components of the headset 100 are discussed below in connection with FIG. 2A.

Figure 1B:
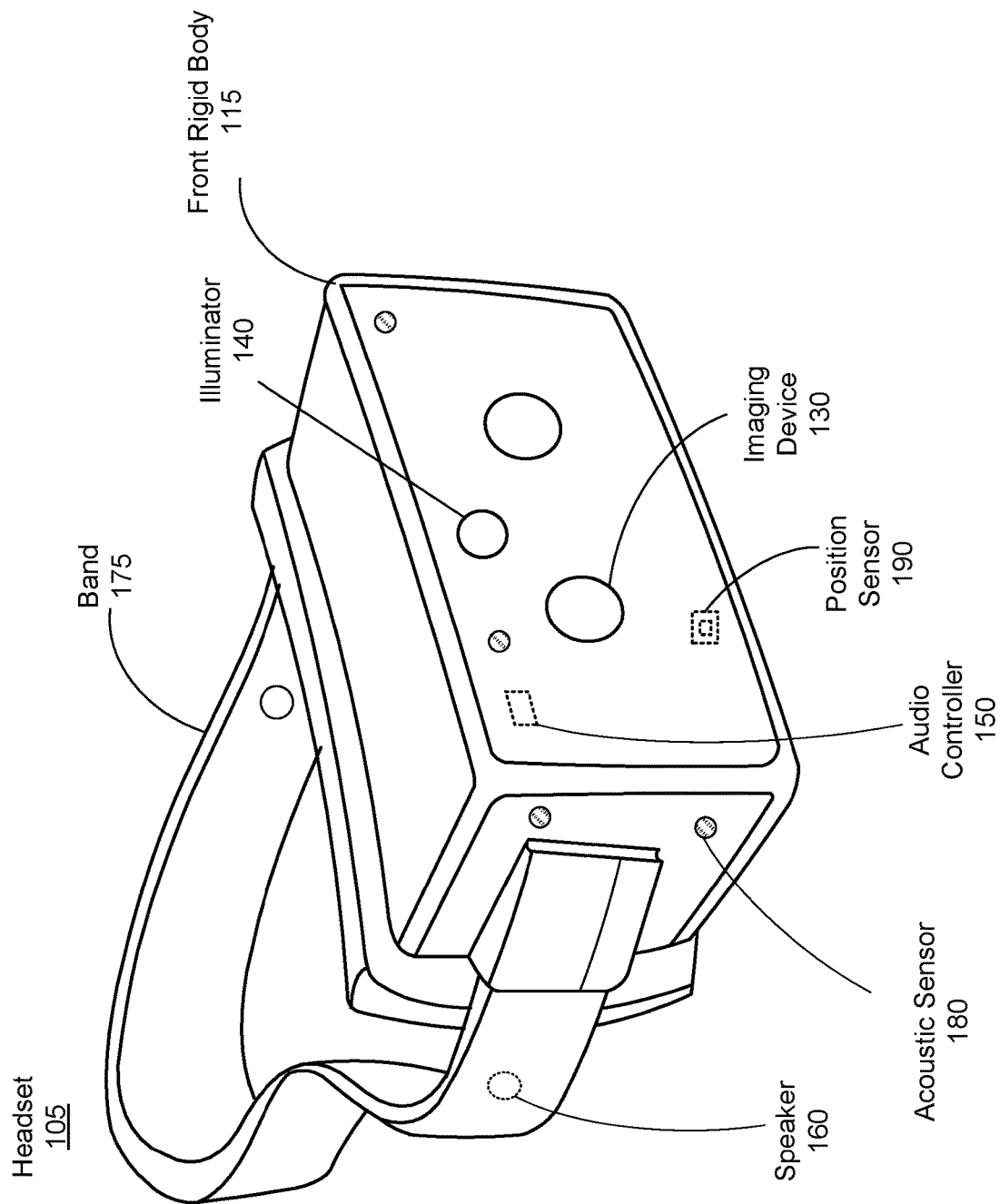
FIG. 1B is a perspective view of a headset implemented as a head-mounted display, in accordance with one or more embodiments.

FIG. 1B is a perspective view of a headset 105 implemented as a HMD, in accordance with one or more embodiments. In embodiments that describe an AR system and/or a MR system, portions of a front side of the HMD are at least partially transparent in the visible band (~380 nm to 750 nm), and portions of the HMD that are between the front side of the HMD and an eye of the user are at least partially transparent (e.g., a partially transparent electronic display). The HMD includes a front rigid body 115 and a band 175. The headset 105 includes many of the same components described above with reference to FIG. 1A, but modified to integrate with the HMD form factor. For example, the HMD includes a display assembly, a DCA, an audio system, and a position sensor 190. FIG. 1B shows the illuminator 140, a plurality of the speakers 160, a plurality of the imaging devices 130, a plurality of acoustic sensors 180, and the position sensor 190. The speakers 160 may be located in various locations, such as coupled to the band 175 (as shown), coupled to front rigid body 115, or may be configured to be inserted within the ear canal of a user.

Figure 2A:
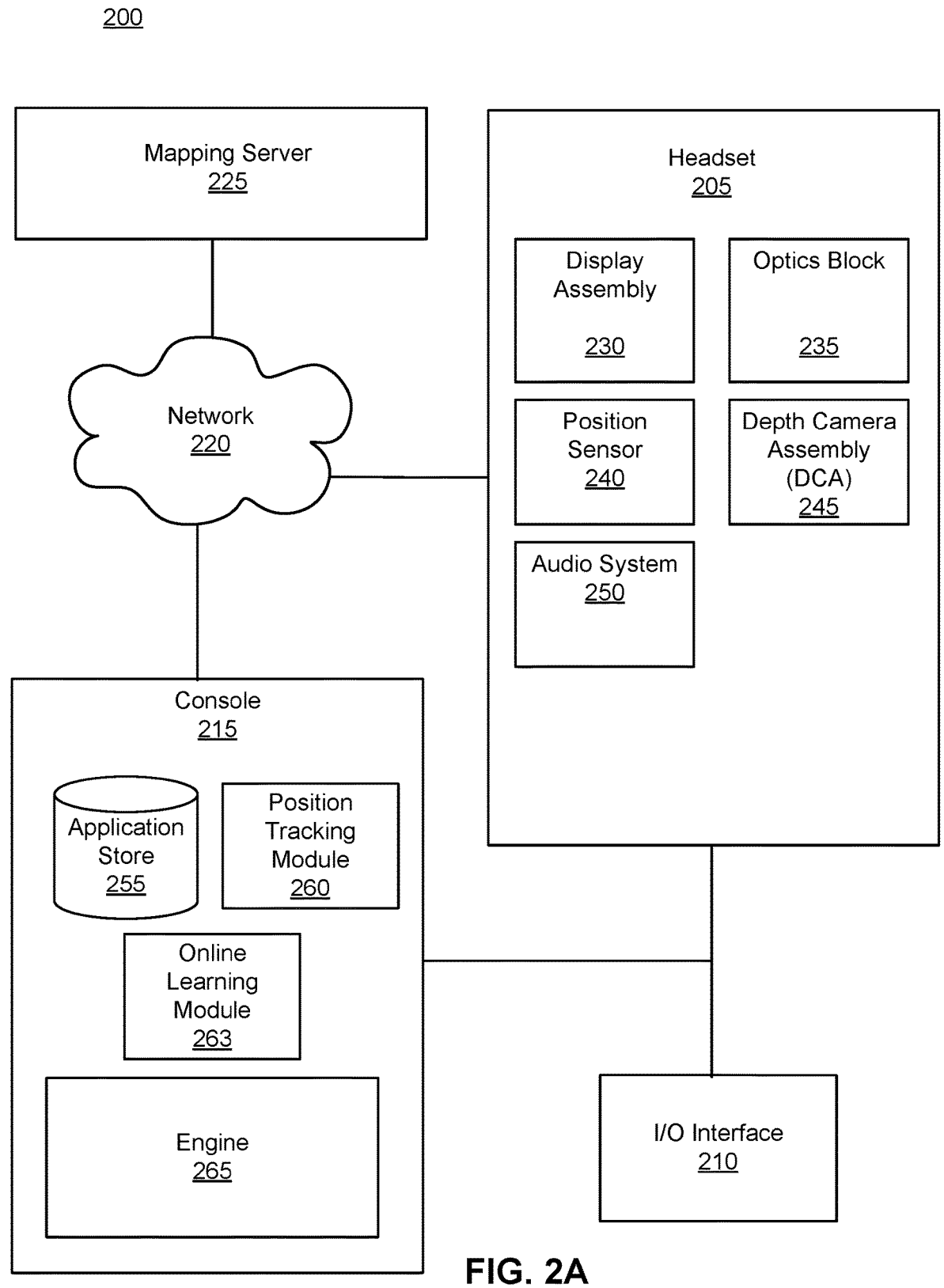
FIG. 2A is a system that includes a headset, in accordance with one or more embodiments.

FIG. 2A is a system 200 that includes a headset 205, in accordance with one or more embodiments. In some embodiments, the headset 205 may be the headset 100 of FIG. 1A or the headset 105 of FIG. 1B. The system 200 may operate in an artificial reality environment (e.g., a virtual reality environment, an augmented reality environment, a mixed reality environment, or some combination thereof). The system 200 shown by FIG. 2A includes the headset 205, an input/output (I/O) interface 210 that is coupled to a console 215, the network 220, and the mapping server 225. While FIG. 2A shows an example system 200 including one headset 205 and one I/O interface 210, in other embodiments any number of these components may be included in the system 200. For example, there may be multiple headsets each having an associated I/O interface 210, with each headset and I/O interface 210 communicating with the console 215. In alternative configurations, different and/or additional components may be included in the system 200. Additionally, functionality described in conjunction with one or more of the components shown in FIG. 2A may be distributed among the components in a different manner than described in conjunction with FIG. 2A in some embodiments. For example, some or all of the functionality of the console 215 may be provided by the headset 205.

The headset 205 includes the display assembly 230, an optics block 235, one or more position sensors 240, and the DCA 245. In some embodiments, the headset 205 includes and audio system 250. Some embodiments of headset 205 have different components than those described in conjunction with FIG. 2A. Additionally, the functionality provided by various components described in conjunction with FIG. 2A may be differently distributed among the components of the headset 205 in other embodiments, or be captured in separate assemblies remote from the headset 205.

The display assembly 230 displays content to the user in accordance with data received from the console 215. The display assembly 230 displays the content using one or more display elements (e.g., the display elements 120). A display element may be, e.g., an electronic display. In various embodiments, the display assembly 230 comprises a single display element or multiple display elements (e.g., a display for each eye of a user). Examples of an electronic display include: a liquid crystal display (LCD), an organic light emitting diode (OLED) display, an active-matrix organic light-emitting diode display (AMOLED), a waveguide display, some other display, or some combination thereof. Note in some embodiments, the display element 120 may also include some or all of the functionality of the optics block 235.

The optics block 235 may magnify image light received from the electronic display, corrects optical errors associated with the image light, and presents the corrected image light to one or both eyeboxes of the headset 205. In various embodiments, the optics block 235 includes one or more optical elements. Example optical elements included in the optics block 235 include: an aperture, a Fresnel lens, a convex lens, a concave lens, a filter, a reflecting surface, or any other suitable optical element that affects image light. Moreover, the optics block 235 may include combinations of different optical elements. In some embodiments, one or more of the optical elements in the optics block 235 may have one or more coatings, such as partially reflective or anti-reflective coatings.

Magnification and focusing of the image light by the optics block 235 allows the electronic display to be physically smaller, weigh less, and consume less power than larger displays. Additionally, magnification may increase the field of view of the content presented by the electronic display. For example, the field of view of the displayed content is such that the displayed content is presented using almost all (e.g., approximately 110 degrees diagonal), and in some cases, all of the user's field of view. Additionally, in some embodiments, the amount of magnification may be adjusted by adding or removing optical elements.

In some embodiments, the optics block 235 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display for display is pre-distorted, and the optics block 235 corrects the distortion when it receives image light from the electronic display generated based on the content.

The position sensor 240 is an electronic device that generates data indicating a position of the headset 205. The position sensor 240 generates one or more measurement signals in response to motion of the headset 205. The position sensor 190 is an embodiment of the position sensor 240. Examples of a position sensor 240 include: one or more IMUS, one or more accelerometers, one or more gyroscopes, one or more magnetometers, another suitable type of sensor that detects motion, or some combination thereof. The position sensor 240 may include multiple accelerometers to measure translational motion (forward/back, up/down, left/right) and multiple gyroscopes to measure rotational motion (e.g., pitch, yaw, roll). In some embodiments, an IMU rapidly samples the measurement signals and calculates the estimated position of the headset 205 from the sampled data. For example, the IMU integrates the measurement signals received from the accelerometers over time to estimate a velocity vector and integrates the velocity vector over time to determine an estimated position of a reference point on the headset 205. The reference point is a point that may be used to describe the position of the headset 205. While the reference point may generally be defined as a point in space, however, in practice the reference point is defined as a point within the headset 205.

The DCA 245 generates depth information for a portion of the local area. The DCA includes one or more imaging devices and a DCA controller. The DCA 245 may also include an illuminator. Operation and structure of the DCA 245 is described above with regard to FIG. 1A.

The audio system 250 provides audio content to a user of the headset 205. The audio system 250 may comprise one or more acoustic sensors, one or more transducers, and an audio controller. The audio system 250 may provide spatialized audio content to the user. In some embodiments, the audio system 250 may request acoustic parameters from the mapping server 225 over the network 220. The acoustic parameters describe one or more acoustic properties (e.g., room impulse response, a reverberation time, a reverberation level, etc.) of the local area. The audio system 250 may provide information describing at least a portion of the local area from e.g., the DCA 245 and/or location information for the headset 205 from the position sensor 240. The audio system 250 may generate one or more sound filters using one or more of the acoustic parameters received from the mapping server 225, and use the sound filters to provide audio content to the user.

The I/O interface 210 is a device that allows a user to send action requests and receive responses from the console 215. An action request is a request to perform a particular action. For example, an action request may be an instruction to start or end capture of image or video data, or an instruction to perform a particular action within an application. The I/O interface 210 may include one or more input devices. Example input devices include: a keyboard, a mouse, a game controller, or any other suitable device for receiving action requests and communicating the action requests to the console 215. An action request received by the I/O interface 210 is communicated to the console 215, which performs an action corresponding to the action request. In some embodiments, the I/O interface 210 includes an IMU that captures calibration data indicating an estimated position of the I/O interface 210 relative to an initial position of the I/O interface 210. In some embodiments, the I/O interface 210 may provide haptic feedback to the user in accordance with instructions received from the console 215. For example, haptic feedback is provided when an action request is received, or the console 215 communicates instructions to the I/O interface 210 causing the I/O interface 210 to generate haptic feedback when the console 215 performs an action.

The console 215 provides content to the headset 205 for processing in accordance with information received from one or more of: the DCA 245, the headset 205, and the I/O interface 210. Additional details about components of the console 215 are included in the description of FIG. 2B. Some embodiments of the console 215 have different modules or components than those described in conjunction with FIG. 2B. Similarly, the functions further described below may be distributed among components of the console 215 in a different manner than described in conjunction with FIG. 2A and FIG. 2B. In some embodiments, the functionality discussed herein with respect to the console 215 may be implemented in the headset 205, or a remote system.

The application store 255 stores one or more applications for execution by the console 215. An application is a group of instructions, that when executed by a processor, generates content for presentation to the user. Content generated by an application may be in response to inputs received from the user via movement of the headset 205 or the I/O interface 210. Examples of applications include: gaming applications, conferencing applications, video playback applications, or other suitable applications.

The position tracking module 260 tracks movements of the headset 205 or of the I/O interface 210 using information from the DCA 245, the one or more position sensors 240, or some combination thereof. For example, the position tracking module 260 determines a position of a reference point of the headset 205 in a mapping of a local area based on information from the headset 205. The position tracking module 260 may also determine positions of an object or virtual object. Additionally, in some embodiments, the tracking module position 260 may use portions of data indicating a position of the headset 205 from the position sensor 240 as well as representations of the local area from the DCA 245 to predict a future location of the headset 205. The position tracking module position 260 provides the estimated or predicted future position of the headset 205 or the I/O interface 210 to the engine 265.

The online learning module 263 trains and executes custom models. For example, the online learning module 263 can train object tracking models that track movements of objects that are detectable by sensors of the headset 100, such as the imaging sensor 130. For example, the online learning module 263 may perform hand tracking computations to track the positions of a user's hands relative to the headset 100. In some embodiments, the online learning module 263 may be used for training other customized models besides tracking movements of the hands of the user, such as eye tracking, or tracking, foot tracking, or item tracking. Furthermore, although the example of object tracking is used throughout this description, it is understood that the online learning module 263 and the processes described herein may be used to train various other kinds of customizable models other than tracking models, such as audio detection models, voice recognition models, movement and vibration analysis models, and the like. Similarly, calibration frames can be understood to represent any calibration input relevant to the particular type of model (e.g., voice recordings, movement data, etc.). In the example of object tracking, the online learning module 263 uses information about calibration frames to adjust customized model predictions about object positions and orientations for different users. Additional information about the online learning module 263 is included in the description of FIG. 2B.

The engine 265 executes applications and receives position information, acceleration information, velocity information, predicted future positions, or some combination thereof, of the headset 205, and predicted positions of objects from the position tracking module 260, the online learning module 263, and from the model engine 295. Based on the received information, the engine 265 determines content to provide to the headset 205 for presentation to the user. For example, if the received information indicates that the user has looked to the left, the engine 265 generates content for the headset 205 that mirrors the user's movement in a virtual local area or in a local area augmenting the local area with additional content. Additionally, the engine 265 performs an action within an application executing on the console 215 in response to an action request received from the I/O interface 210 and provides feedback to the user that the action was performed. The provided feedback may be visual or audible feedback via the headset 205 or haptic feedback via the I/O interface 210.

The network 220 couples the headset 205 and/or the console 215 to the mapping server 225. The network 220 may include any combination of local area and/or wide area networks using both wireless and/or wired communication systems. For example, the network 220 may include the Internet, as well as mobile telephone networks. In one embodiment, the network 220 uses standard communications technologies and/or protocols. Hence, the network 220 may include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 220 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 220 can be represented using technologies and/or formats including image data in binary form (e.g. Portable Network Graphics (PNG)), hypertext markup language (HTML), extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc.

The mapping server 225 may include a database that stores a virtual model describing a plurality of spaces, wherein one location in the virtual model corresponds to a current configuration of a local area of the headset 205. The mapping server 225 receives, from the headset 205 via the network 220, information describing at least a portion of the local area and/or location information for the local area. The user may adjust privacy settings to allow or prevent the headset 205 from transmitting information to the mapping server 225. The mapping server 225 determines, based on the received information and/or location information, a location in the virtual model that is associated with the local area of the headset 205. The mapping server 225 determines (e.g., retrieves) one or more acoustic parameters associated with the local area, based in part on the determined location in the virtual model and any acoustic parameters associated with the determined location. The mapping server 225 may transmit the location of the local area and any values of acoustic parameters associated with the local area to the headset 205.

One or more components of system 200 may contain a privacy module that stores one or more privacy settings for user data elements. In some embodiments, the privacy module also stores embeddings used for online learning. The user data elements describe the user or the headset 205. For example, the user data elements may describe a physical characteristic of the user, an action performed by the user, a location of the user of the headset 205, a location of the headset 205, an HRTF for the user, etc. Privacy settings (or "access settings") for a user data element may be stored in any suitable manner, such as, for example, in association with the user data element, in an index on an authorization server, in another suitable manner, or any suitable combination thereof.

A privacy setting for a user data element specifies how the user data element (or particular information associated with the user data element) can be accessed, stored, or otherwise used (e.g., viewed, shared, modified, copied, executed, surfaced, or identified). In some embodiments, the privacy settings for a user data element may specify a "blocked list" of entities that may not access certain information associated with the user data element. The privacy settings associated with the user data element may specify any suitable granularity of permitted access or denial of access. For example, some entities may have permission to see that a specific user data element exists, some entities may have permission to view the content of the specific user data element, and some entities may have permission to modify the specific user data element. The privacy settings may allow the user to allow other entities to access or store user data elements for a finite period of time.

The privacy settings may allow a user to specify one or more geographic locations from which user data elements can be accessed. Access or denial of access to the user data elements may depend on the geographic location of an entity who is attempting to access the user data elements. For example, the user may allow access to a user data element and specify that the user data element is accessible to an entity only while the user is in a particular location. If the user leaves the particular location, the user data element may no longer be accessible to the entity. As another example, the user may specify that a user data element is accessible only to entities within a threshold distance from the user, such as another user of a headset within the same local area as the user. If the user subsequently changes location, the entity with access to the user data element may lose access, while a new group of entities may gain access as they come within the threshold distance of the user.

The system 200 may include one or more authorization/privacy servers for enforcing privacy settings. A request from an entity for a particular user data element may identify the entity associated with the request and the user data element may be sent only to the entity if the authorization server determines that the entity is authorized to access the user data element based on the privacy settings associated with the user data element. If the requesting entity is not authorized to access the user data element, the authorization server may prevent the requested user data element from being retrieved or may prevent the requested user data element from being sent to the entity. Although this disclosure describes enforcing privacy settings in a particular manner, this disclosure contemplates enforcing privacy settings in any suitable manner.

Figure 2B:
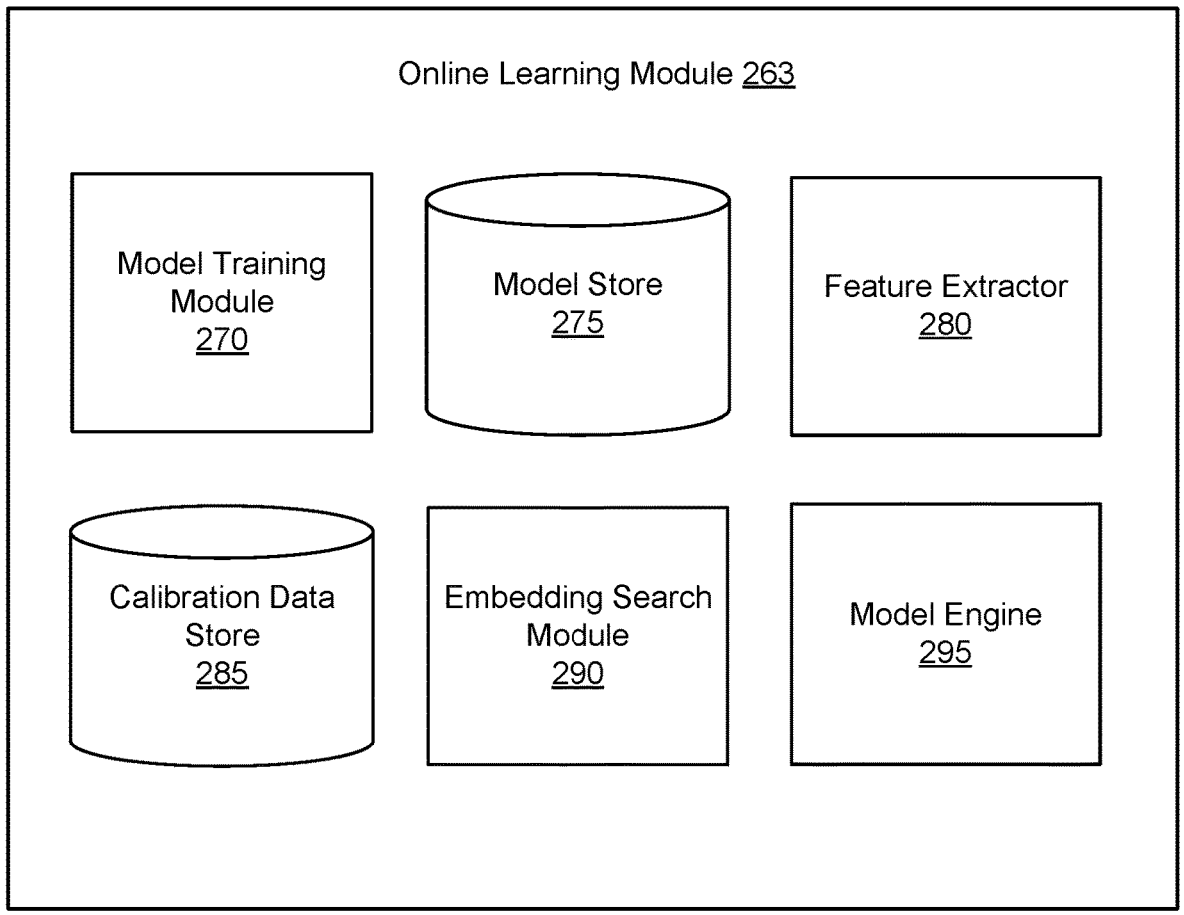
FIG. 2B illustrates a system architecture of the online learning module, in accordance with an embodiment.

FIG. 2B illustrates a system architecture of the online learning module 263, in accordance with an embodiment. The online learning module 263 executes model computations, such as for hand-tracking, foot tracking, object tracking, and eye-tracking. In the example shown in FIG. 2B, the online learning module 263 includes a model training module 270, a model store 275, a feature extractor 280, a calibration data store 285, an embedding search module 290, and a model engine 295. In various embodiments, the online learning module 263 may have different modules and the modules may be in different locations within the console 215 and/or the headset 205.

The model training module 270 facilitates training of machine learning models that are used to generate feature embeddings and to generate predictions or classifications, for example, as associated with tracking an object. In one embodiment, the models trained by the model training module 270 for use by the online learning module 263 are neural networks, such as convolutional neural networks (CNNs). Some of the CNNs trained by the model training module 170 are feature extractor CNNs that, given a frame, output a feature embedding representative of the given frame. These CNNs may be used by the model engine 295 to generate initial representations of a target frame that is provided for analysis. In some embodiments, the CNNs trained by the model training module 270 already have starting weights based on an initial training that was done separate from the system 200 (e.g., as a part of the initial software released with the system 200). The training done by the model training module 270 adjusts the weights of the models to customize them for certain users of the system 200.

The model training module 270 also trains additional CNNs to be able to generate predictions about the target frame. In particular, the additional CNNs may be trained to predict a difference between a value of an attribute in a stored calibration frame and a value of the attribute in a given target frame. For example, a CNN may be trained to predict the location difference between a center position of a left hand in a target frame and a center position of a left hand in a calibration frame. These CNNs are configured to accept a feature embedding of the target frame, a feature embedding of a calibration frame, and information about the calibration frame, such as ground truth data. In some embodiments, the CNNs are additionally or alternately configured to accept an embedding representing a difference between the feature embedding of the target frame and the feature embedding of the calibration frame along with information about the calibration frame. Depending on the specific attribute the CNN is trained to evaluate, the CNN may output a binary classification or may output a value representative of a difference between the attribute in the calibration frame and the attribute in the target frame. Examples of additional CNNs that may be trained by the model training module 270 include a model that classifies the type of object in the frame, a model that classifies whether a hand in the frame is a left hand or a right hand, a model that outputs a predicted distance between a center of the object in the target frame and a center of the object in the calibration frame, and a model that outputs a predicted difference in size between a radius of the object in the target frame and the radius of the object shown in the calibration frame.

To train the CNNs, the model training module 270 runs training target frames and training calibration frames through the first CNN which produces feature embeddings of the frames. The feature embeddings and ground truth information about the training calibration frames are then provided to one or more additional CNNs which produce predictive outputs. The model training module 170 compares ground truth information about the attributes of the training target frame to the predictions any error is back-propagated through some or all of the CNNs to adjust their weights. This training process is repeated for a plurality of training target frames to adjust the CNN weights.

The model store 275 stores the machine learning models used by the online learning module 263. Storing the machine learning models can include storing model architecture data and storing model weights. For example, when the CNN models are trained by the model training module 270, the weights associated with the neural network layers are stored in the model store 275 for later access by the feature extractor 280 and the model engine 295. In various embodiments, the model store 275 may store more or fewer models and may store additional metadata related to the machine learning models.

The feature extractor 280 generates feature embeddings of image frames. To generate feature embeddings, the feature extractor 280 uses a CNN (or other type of machine learning model) that is trained to generate feature embeddings and that is stored in the model store 275. The feature extractor 280 generates feature embeddings for target frames at the time of analysis of the target frames. Additionally, the feature extractor 280 generates feature embeddings for calibration frames. The feature embeddings for calibration frames may be generated when the calibration frames are captured for a particular user. In addition to generating feature embeddings for the calibration frames, in some embodiments the feature extractor 280 identifies and annotates ground truth data associated with the calibration frames for storage along with the calibration frame feature embeddings in the calibration data store. In alternate embodiments, another module of the system may identify the ground truth data for the calibration frames. Examples of ground truth data include a center of a hand in the calibration image frame, a radius of the hand in the calibration image frame, and a classification of whether the hand in the calibration image frame is a left hand or is a right hand.

The calibration data store 285 stores information about calibration frames that can be used by the model engine to generate personalized predictions about input frames for users. The calibration data store 285 stores calibration frames, calibration frame embeddings (as generated by the feature extractor 280), and ground truth data (e.g., left/right classification, actual object radius, actual center). The ground truth labels for calibration frames (e.g., labeled target frames) may be generated at the time that the calibration frames are captured and may be stored along with the calibration frames in the calibration data store 285. In some embodiments, the data in the calibration data store 285 is stored in a non-volatile memory based ternary content-addressable memory (NVM-based TCAM). Calibration frames and their associated metadata may be stored for multiple users of the system 200. In this way, the online learning module 263 can access the calibration frames that are most appropriate for a specific user of the system 200.

The embedding search module 290 identifies a sample embedding from the calibration frame embeddings stored in the calibration data store 285 that is most similar to the target feature embedding generated for a target frame. To allow for personalized predictions for different users without having to train and store entirely new models for each user, the online learning module 263 can instead access the calibration data for the particular user as stored in the calibration data store 285. In one embodiment, the embedding search module 290 performs a similarity search (e.g., a search for an embedding having the least distance compared to a given embedding) to determine which of the sample calibration embeddings is closest (i.e., most closely matches) the target feature embedding for the target frame. In some embodiments, the embedding search module 290 generates a match score for each of the sample calibration embeddings. The match score is representative of the results of the distance computation between the target feature embedding and a sample calibration embedding. The embedding search module 290 may select which sample calibration embedding to use based on the match score value. The selected calibration frame embedding and ground truths associated with the same calibration frame are provided to the model engine as inputs to the machine learning models. In some embodiments, the embedding search module 290 provides the model engine 295 with a combined embedding that represents the difference between the target feature embedding and the selected sample calibration embedding, rather than providing the sample calibration embedding directly to the model engine 295 for processing.

The model engine 295 manages execution of one or more additional CNNs to predict information about the target frame. The model engine 295 accesses the machine learning models from the model store 275 that will be used to analyze the target frame. The target frame embedding is received from the feature extractor 280. A combined embedding representing a difference between the target feature embedding and the identified closest sample calibration embedding is received from the embedding search module 290 along with ground truth data about the calibration frame associated with the selected calibration embedding. In some embodiments, the model engine 295 receives the sample calibration embedding from the embedding search module 290 rather than the combined embedding. The model engine 295 provides the embeddings and the ground truths as inputs into the one or more additional CNNs. The CNNs produce predictions about differences between the selected calibration frame and the target frame. The model engine 295 combines the calibration frame data with the predicted differences to generate a prediction about the target frame. For example, an object tracking model may generate a prediction about locations, sizes, or other attributes of objects in the target frame.

Figure 3:
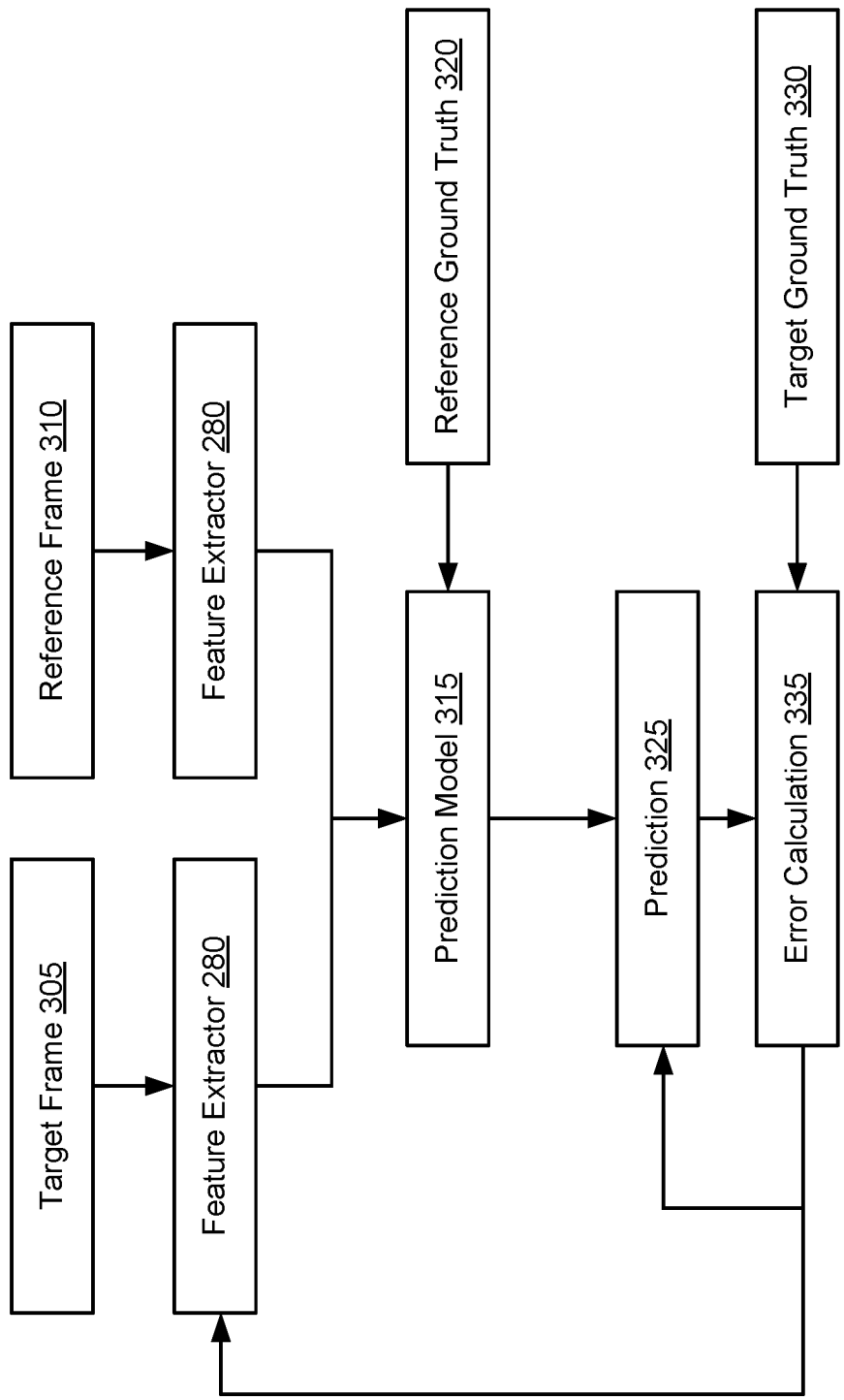
FIG. 3 is a high level block diagram of a training pipeline for the online learning module, in accordance with an embodiment.

FIG. 3 is a high level block diagram of a training pipeline for the online learning module 263, in accordance with an embodiment. A target frame 305 and a reference frame 310 (e.g., a calibration frame used for training) are provided to the feature extractor 280. The feature extractor uses a first machine learning model (e.g., CNN) to generate a target feature embedding for the target frame 305 and a reference frame embedding for the reference frame 310. In one embodiment, the feature extractor 280 further generates a combined embedding that represents the difference between the generated target feature embedding and the generated reference frame embedding.

The combined embedding is provided as input to a prediction model 315. The prediction model 315 may be an additional CNN with weights stored in the model store 275 that is configured to generate a prediction about a difference between an attribute of an input target frame and the same attribute in the input calibration frame (i.e., reference frame 310). The model training module 270 also provides a reference ground truth 320 to the prediction model 315. The reference ground truth 320 is the ground truth about the particular attribute that the prediction model 315 is configured to predict for the reference frame. For example, if a reference frame 310 includes a hand in the frame, and the prediction model 315 is configured to find a center of the hand in a given frame, then the reference ground truth 320 would be a labeled value indicating the position of the center of the hand in the reference frame 310.

The prediction model 315 generates a prediction 325. The prediction 325 is a value representing a predicted difference between the attribute in the reference frame and the attribute in the target frame 305. For example, the prediction 325 may be a value indicating that the center of the hand in the target frame is predicted to be 20 pixels to the left and 7 pixels down from where the center of the hand in the reference frame is located.

To train the CNN of the prediction model 315 and the CNN of the feature extractor 280, the model training module 270 generates an error calculation 335 using the labeled target ground truth 330 (e.g., the actual location of the center of the hand in the target frame 305). The error calculation 335 is used to backpropagate the error through the pipeline to update the weights of the CNNs. The training process of FIG. 3 may be repeated with many reference frames 310 and target frames 305 to improve the weights in the machine learning models.

Figure 4:
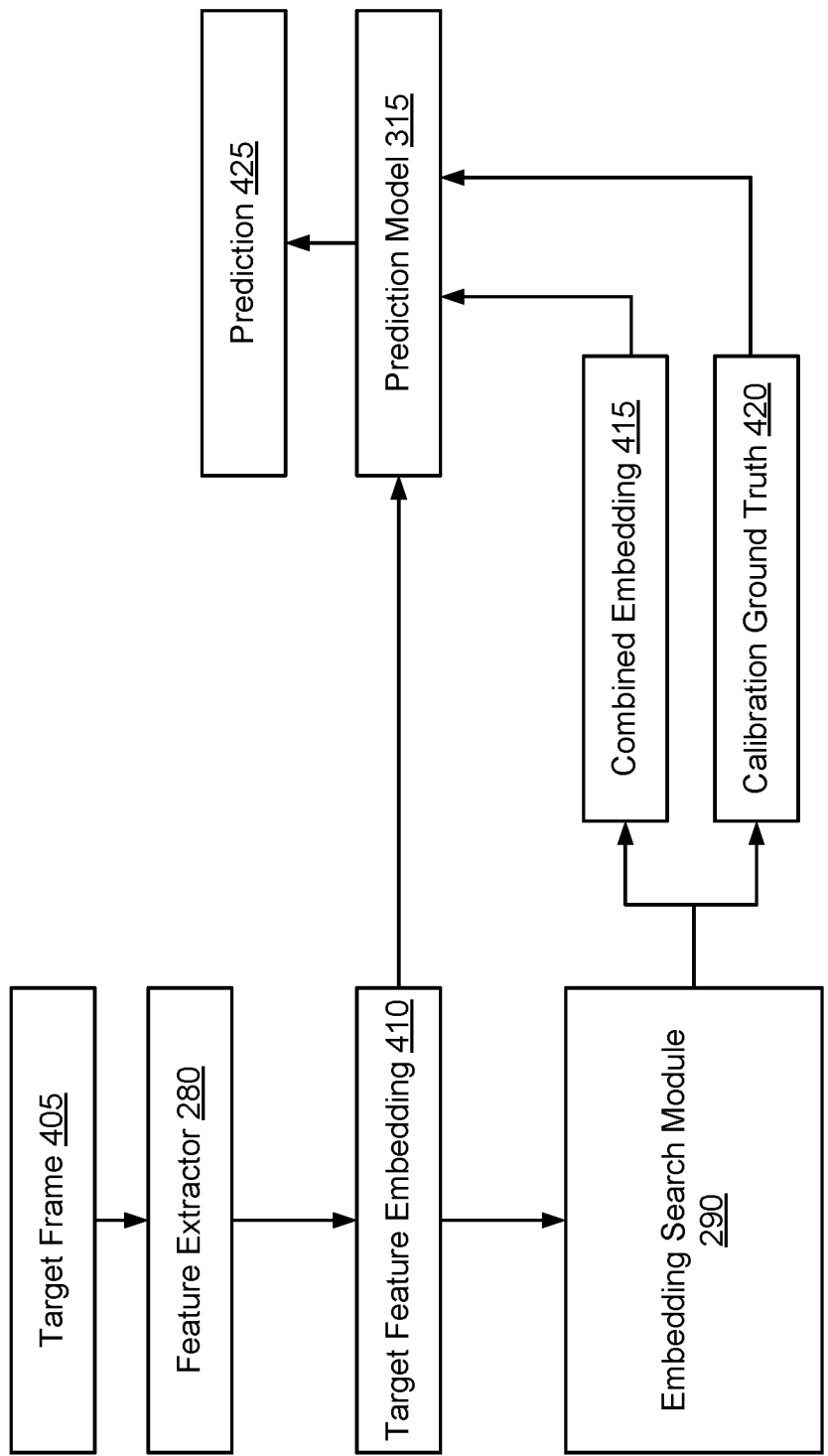
FIG. 4 is a high level block diagram of a deployment pipeline for the online learning module, in accordance with an embodiment.

FIG. 4 is a high level block diagram of a deployment pipeline for the online learning module 263, in accordance with an embodiment. The online learning module 263 receives a target frame 405. For example, a target frame 405 may be an image of an object to track. The target frame is run through the trained CNN of the feature extractor 280 to generate a target feature embedding 410 that represents the target frame 405.

Using the target feature embedding 410 as input, the embedding search module 290 identifies, from the calibration data store 285, a sample calibration embedding that is closest to the target feature embedding 410 out of the set of stored calibration embeddings for the current user of the system. The embedding search module 290 produces a combined embedding 415 that is a combination of the identified calibration embedding and the target feature embedding 410 (e.g., a difference between the two embeddings). The embedding search module 290 also accesses the calibration ground truth 420 that is associated with the identified calibration embedding for the particular attribute that is being analyzed. The combined embedding 415 and the calibration ground truth 420 are provided with the target feature embedding 410 as inputs to the trained prediction model 315. The trained prediction model 315 may be a CNN trained to output a prediction 425 that is a value indicative of a likely difference between the target frame and the selected calibration frame.

Figure 5:
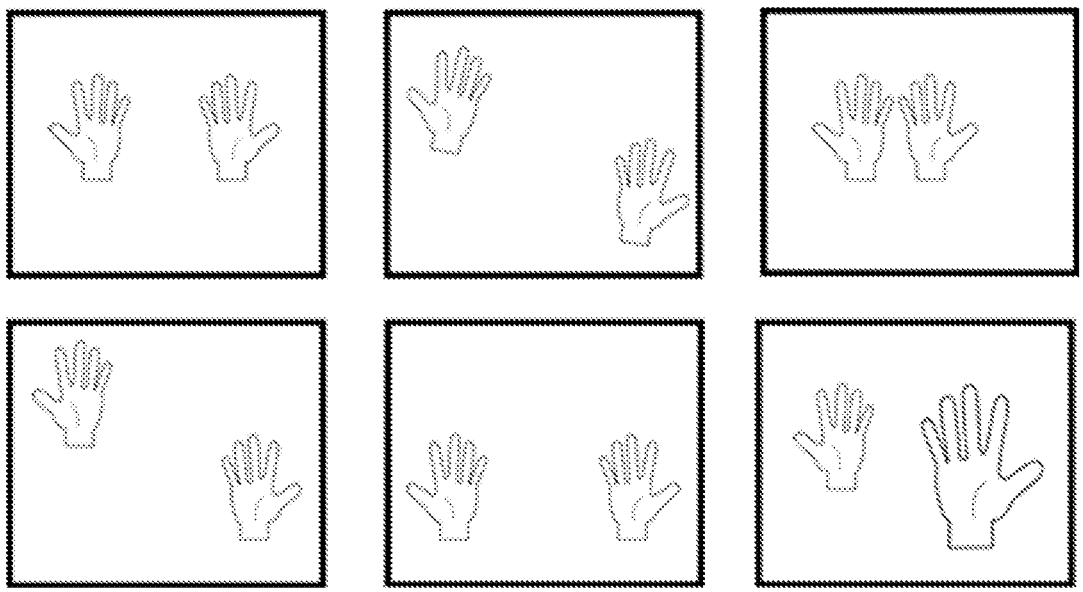
FIG. 5 illustrates an example set of calibration frames, in accordance with an embodiment.
Figure 6:
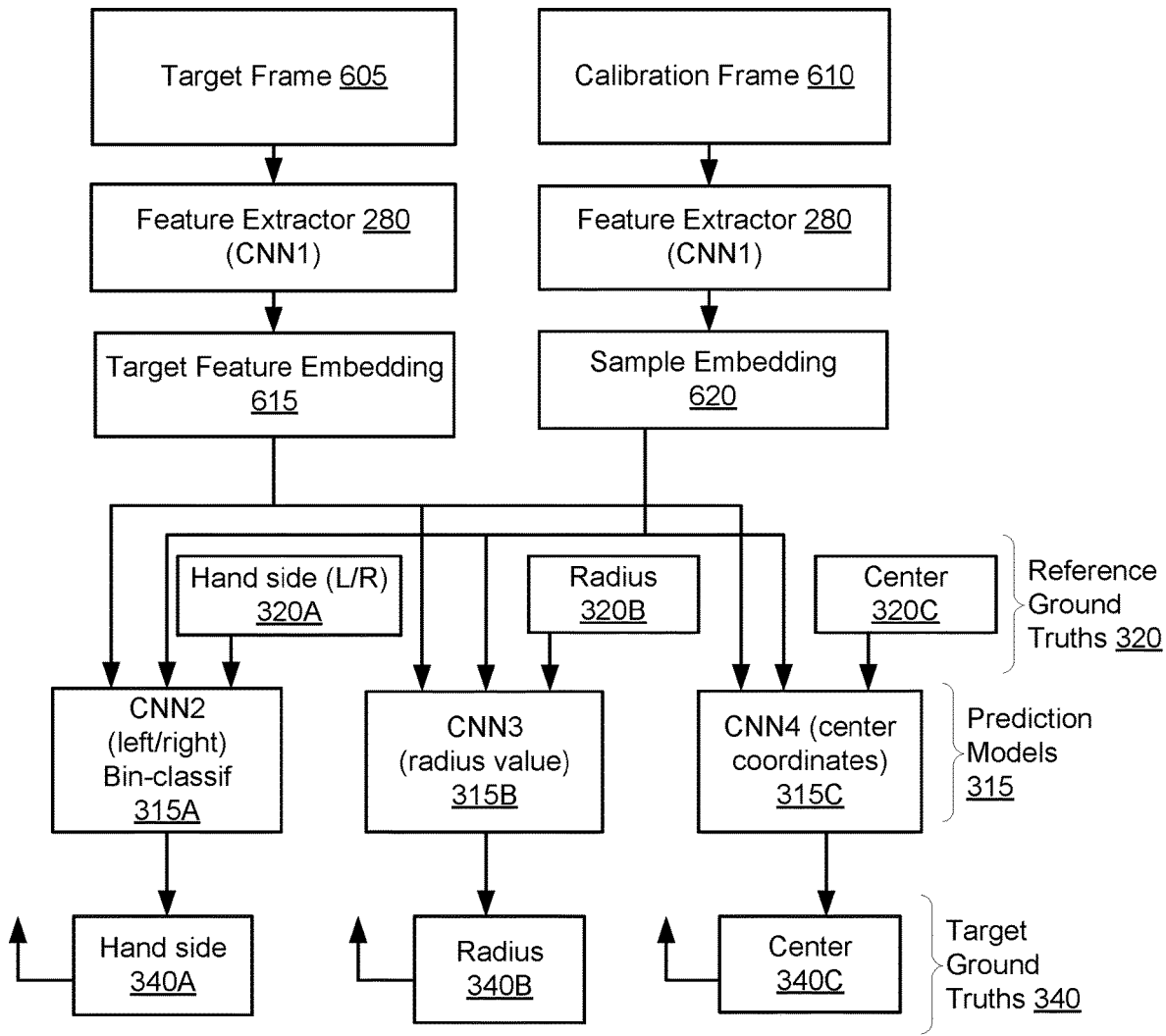
FIG. 6 illustrates an example of training prediction models for hand tracking, in accordance with an embodiment.
Figure 7:
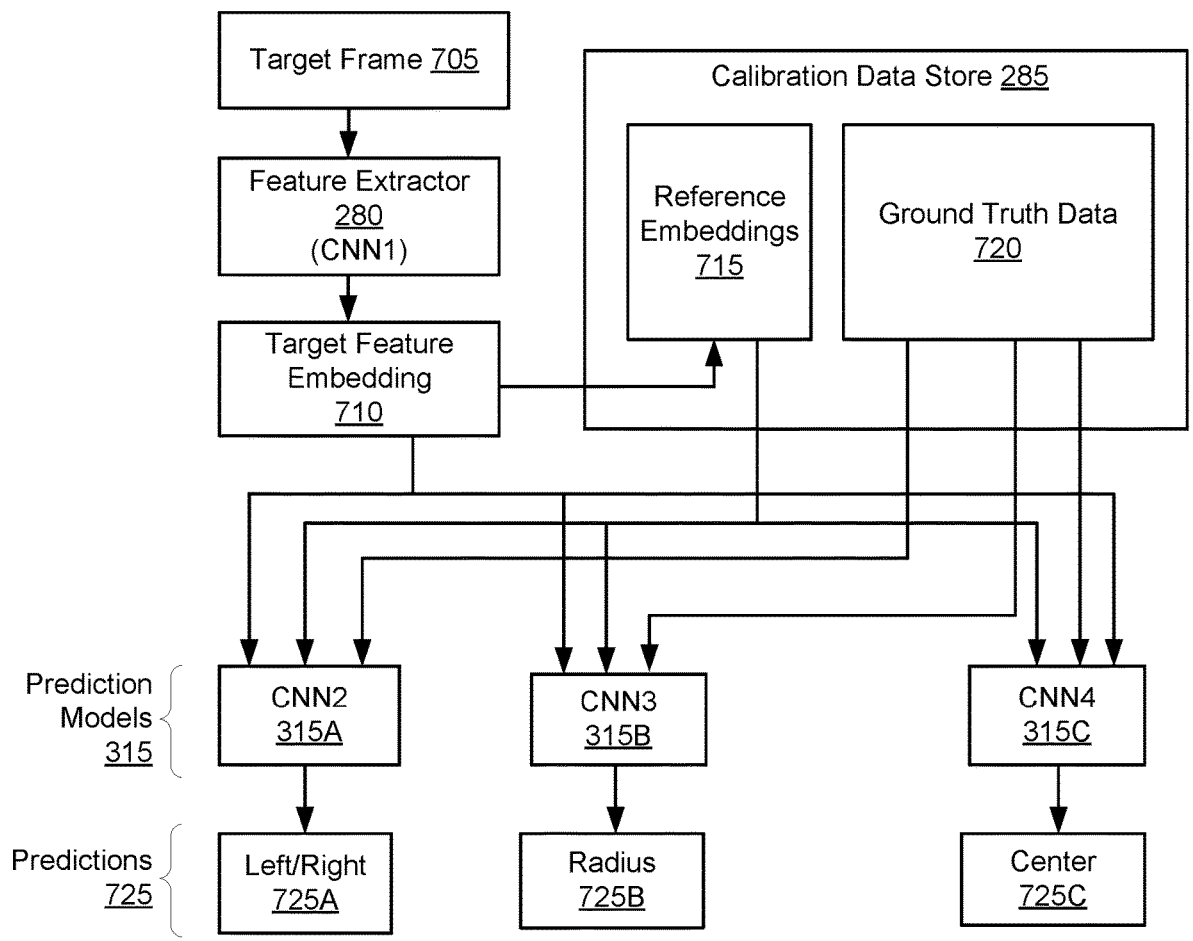
FIG. 7 illustrates an example deployment of models for hand tracking, in accordance with an embodiment.

The examples described in relation to the following FIGS. 5-7 are related to object tracking, in particular hand tracking. However, it is appreciated that the online learning module 263 may be used in various other scenarios.

FIG. 5 illustrates an example set of calibration frames, in accordance with an embodiment. The example set of calibration frames 500 is for an example of using the online learning module 263 to track hand positions. To obtain the calibration frames, the system 200 may prompt the user to perform a set of calibration exercises whereby the user is asked to place the hands in bounding circles displayed on the AR screen to generate a reference set. In some embodiments, additional post processing is performed on the sample calibration frames 500 to replace background data, to generate rotation/scaling changes, and to generate ground truth data. The set of calibration frames 500 may be passed through the feature extractor 280 to generate calibration frame embeddings, and may be stored with the calibration frame embeddings and ground truth data in the calibration data store 285.

FIG. 6 illustrates an example of training prediction models for hand tracking, in accordance with an embodiment. The process is analogous to the process described in FIG. 3, but here is applied more specifically to training machine learning models for hand tracking (e.g., CNN2, CNN3, and CNN4 of FIG. 6), for the sake of example. The model training module 270 provides a target frame 605 and a corresponding calibration frame 610 for training. The target frame 605 is run through the feature extractor 280 (e.g., CNN1) to generate the target feature embedding 615 that represents the target frame 605. The calibration frame 610 is also run through the feature extractor 280 (e.g., CNN1) to generate the sample embedding 620 that represents the calibration frame 610.

In the hand-tracking example of FIG. 6, three prediction models 315 are trained to generate predictions about different attributes associated with hand tracking. The example includes a left/right binary classifier prediction model 315A (i.e., CNN2), a radius value prediction model 325B (i.e., CNN3), and a center coordinates prediction model 315C (i.e., CNN4). The left/right binary classifier prediction model 315A receives the target feature embedding 615, the sample embedding 620, and a hand side reference ground truth 320A as input. In an alternate embodiment, the left/right binary classifier prediction model 315A receives a single embedding representative of a combination (e.g., a difference) between the target feature embedding 615 and the sample embedding 620 rather than receiving the two embeddings independently. The left/right binary classifier prediction model 315 outputs a prediction of an identification of hands in a target image to determine which hand is which in the target image. The target ground truth for hand side 340A is compared to the prediction of the left/right binary classifier prediction model 315A and the error is backpropagated through CNN2 315A and through the CNN1 of the feature extractor 280 to adjust the weights of the neural networks.

The radius value prediction model 315B receives the target feature embedding 615, the sample embedding 610, and the radius reference ground truth 320 as inputs. In an alternate embodiment, the radius prediction model 315B receives a single embedding representative of a combination (e.g., a difference) between the target feature embedding 615 and the sample embedding 620 rather than receiving the two embeddings independently. The radius reference ground truth 320 is an identification of the radius length of one or more hands in the calibration frame 610. The radius value prediction model 315B predicts, for each of the one or more hands, a difference between the length of the radius of the hand shape in the calibration frame 610 and the radius of the hand shape in the target frame 605. The prediction is used to generate a prediction of the radius of the hand shape in the target frame 605, which is compared to the radius target ground truth 340B that represents the actual radius length of the hand shape in the target frame 605. The comparison is used to generate an error value that is backpropagated through CNN3 315B and CNN1 of the feature extractor 280 to adjust the weights of the neural networks.

The center value prediction model 315C (e.g., CNN4) receives the target feature embedding 615 and the sample embedding 630 as inputs. In an alternate embodiment, the center prediction model 325C receives a single embedding representative of a combination (e.g., a difference) between the target feature embedding 615 and the sample embedding 620 rather than receiving the two embeddings independently. The center prediction model 315 also receives the center reference ground truth 320C as input. The center reference ground truth is values indicative of the center coordinates of the one or more hand shapes in the calibration frame 610. For each of the hand shapes in the center prediction model 315C outputs a prediction of a distance between the center of the hand shape in the calibration frame 610 and the center of the hand shape in the target frame 605 (e.g., in the form of a vector). The prediction is used to produce a prediction of the location of the center of the hand shape in the target frame 605. This prediction is compared with the center target ground truth 340C that represents the actual center of the hand shape in the target frame 605. Error values are generated from the comparison and are back-propagated through CNN4 and CNN1 of the feature extractor 280 to adjust the weights of the neural networks.

FIG. 7 illustrates an example deployment of models for hand tracking, in accordance with an embodiment. The process is analogous to the process described in FIG. 4, but here is applied more specifically to machine learning models for hand tracking (e.g., CNN2, CNN3, and CNN4), for the sake of example. The target frame 705 (e.g., a live frame received from the headset 100 is provided as input to the trained CNN1 of the feature extractor 280, which generates a target feature embedding 710.

The target feature embedding 710 is used by the embedding search module 290 to search for a closest sample embedding from among the set of reference embeddings 715 that are the sample embeddings stored for the calibration frames. In particular, the embedding search module 290 identifies a closest embedding to the target feature embedding 710 from among the reference embeddings associated with the current user of the system 200. Once a sample embedding is selected from among the set of reference embeddings in the calibration data store 285, the sample embedding and ground truth data 720 associated with the selected sample embedding are provided to the prediction models, along with the target feature embedding 710. In some embodiments, the embedding search module 290 generates a sample embedding that represents a combination (e.g., a difference) of the target feature embedding 710 and the selected sample embedding and provides the combined embedding as input to the prediction models 315 in addition or in place of the sample embedding from the reference embeddings 715. Examples of ground truth data 720 may include identification of left and right hand shapes in a calibration frame, a radius of a hand shape in a calibration frame, and center coordinates of a hand shape in a calibration frame.

The prediction models 315 (e.g., CNN2 315A, CNN3 315B, and CNN4 315C) generate predictions. In the hand tracking example of FIG. 7, the predictions 725 include left/right identification 725, radius prediction 725B, and center prediction 725C. The prediction models 315 output values that represent predicted differences between the values of the calibration frame associated with the selected sample embedding and the target frame 705. For example, the CNN4, the prediction model 315C, generates a value (e.g., a vector) that is a prediction of where the center of the hand shape in the target frame is in relation to the center of the hand shape in the calibration frame associated with the selected sample embedding. These predictions can then be used by the online learning module 263 to generate predicted information about the target frame 705. For example, the prediction produced by the CNN4 315C could be combined with the known information about the calibration frame ground truth to generate a predicted location of the center of the hand shape in the target frame 705.

Figure 8:
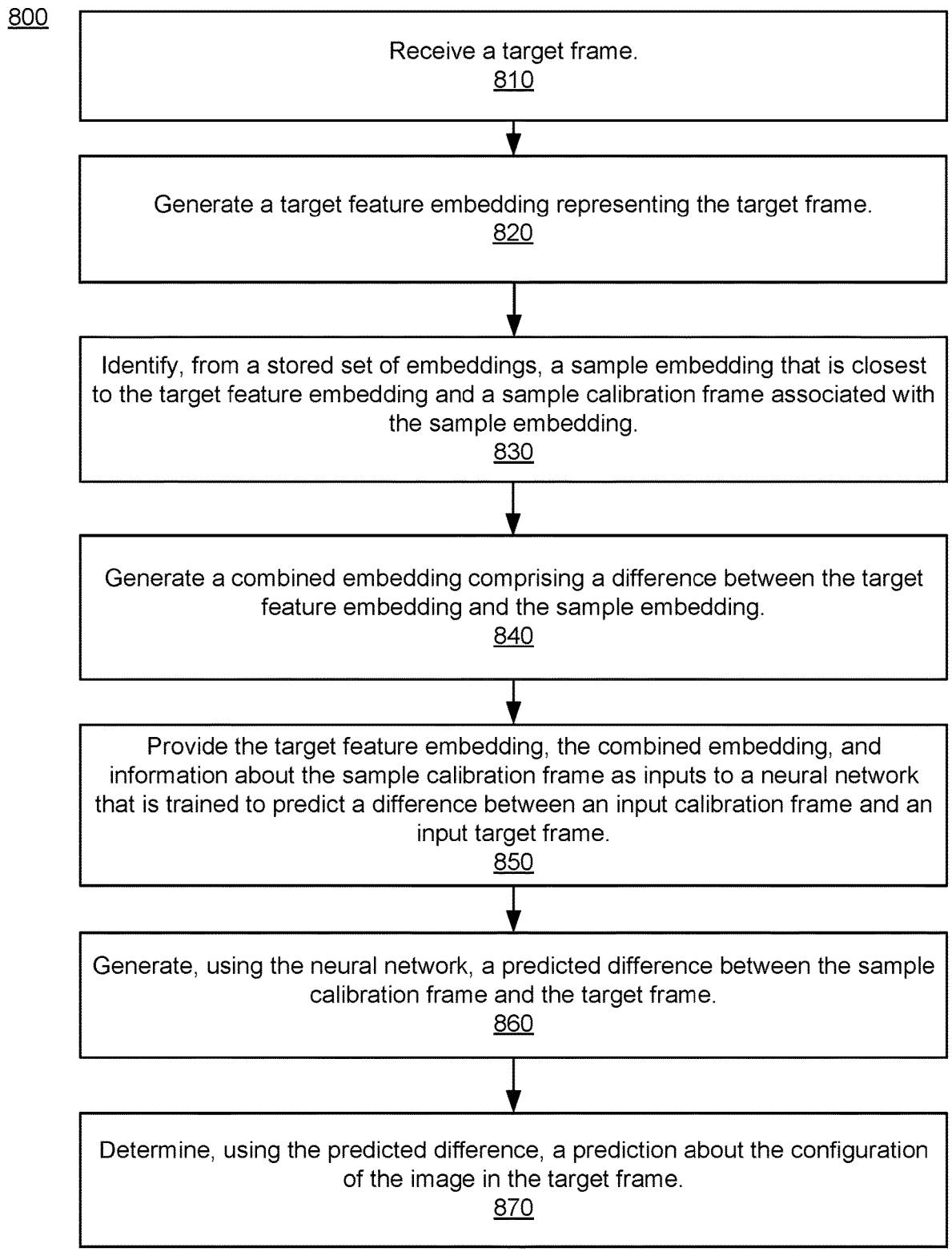
FIG. 8 is a flowchart of a process for generating object tracking predictions, in accordance with one or more embodiments.

FIG. 8 is a flowchart of a process 800 for generating predictions, in accordance with one or more embodiments. The process shown in FIG. 8 may be performed by components of the system 200. Other entities may perform some or all of the steps in FIG. 8 in other embodiments. Embodiments may include different and/or additional steps, or perform the steps in different orders.

The online learning module 263 receives 810 a target frame. A target frame may be a live frame (e.g., as received from a headset 100 that is in use), or a target frame may be another image frame (or other format of input data) for analysis. The feature extractor 280 is applied to the target frame to generate 820 a target feature embedding representing the target frame. The embedding search module 290 uses the target feature embedding to identify 830, from a stored set of embeddings, a sample embedding that is closest to the target feature embedding and a sample calibration frame that is associated with the sample embedding. For example, embeddings can be represented within a vector space and the closest sample embedding to the target frame embedding would be the embedding with the closest vector within the vector space. The online learning module 263 generates 840 a combined embedding comprising a difference between the target feature embedding and the sample embedding.

The model engine 295 provides 850 the target feature embedding, the combined embedding, and information about the sample calibration frame as inputs to a neural network (i.e., a prediction model) that is trained to predict a difference between an input calibration frame and an input target frame. The model engine 295 generates 860 a predicted difference between the sample calibration frame and the target frame using the neural network and uses the predicted difference to determine 870 a prediction about the configuration of the image in the target frame.

Additional Configuration Information

The foregoing description of the embodiments has been presented for illustration; it is not intended to be exhaustive or to limit the patent rights to the precise forms disclosed. Persons skilled in the relevant art can appreciate that many modifications and variations are possible considering the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. An augmented-reality headset storing executable instructions that, when executed, cause the augmented-reality headset to perform steps comprising:
   capturing, via a camera communicatively coupled to the augmented-reality headset, a target frame, wherein the target frame includes a portion of a wearer of the augmented-reality headset;
   generating, based on the target frame, a target feature embedding representing the target frame;
   identifying, from a stored set of embeddings that is distinct from the target feature embedding, a sample embedding that is closest to the target feature embedding and a sample calibration frame associated with the sample embedding, wherein the sample embedding is distinct from the target feature embedding and the sample calibration frame is distinct from the target frame;
   generating a combined embedding comprising a difference between the target feature embedding and the sample embedding;
   providing the target feature embedding, the combined embedding, and information about the sample calibration frame as inputs to a neural network that is trained to predict a difference between an input calibration frame and an input target frame;
   generating, using the neural network, a predicted difference between the sample calibration frame and the target frame;
   predicting, based on the predicted difference and the neural network, a configuration of the portion of the wearer in the target frame; and
   in accordance with a determination that the configuration of the portion of the wearer in the target frame is indicating a leftward direction, updating an image displayed at a display that is communicatively coupled to the augmented-reality headset so that the image is panned in the leftward direction.

2. The augmented-reality headset of claim 1, wherein identifying the sample embedding that is most similar to the target feature embedding comprises determining the distance between the target feature embedding and each of the embeddings in the stored set of embeddings.

3. The augmented-reality headset of claim 1, the steps further comprising:
   prompting the wearer of the augmented-reality headset to generate a set of calibration frames;
   for each of the calibration frames generating, using a trained neural network, a feature embedding representative of the calibration frame;
   storing each of the calibration frames in association with its feature embedding in a stored set of embeddings associated with the wearer; and
   wherein the augmented-reality headset store a different set of calibration frames and associated set of embeddings for each wearer of the augmented-reality headset.

4. The augmented-reality headset of claim 1, wherein training the neural network comprises:
   providing a target training frame and a target calibration frame;
   generating an embedding of the target training frame;
   generating an embedding of the target calibration frame;
   providing the embedding of the target training frame and the embedding of the target calibration frame to the neural network;
   generating a prediction about the target training frame based on the output of the neural network;
   comparing the target training frame to the prediction; and
   adjusting weights of the neural network in response to the comparison.

5. The augmented-reality headset of claim 1, wherein the augmented-reality headset performs one of hand tracking, object tracking, face tracking, or eye tracking.

6. The augmented-reality headset of claim 1, wherein the neural network is trained to perform one of determining; a classification of a left or right hand, a radius of a shape of a hand, or a center of a shape of a hand.

7. The augmented-reality headset of claim 1, the steps further comprising:
   in accordance with a determination that the configuration of the portion of the wearer in the target frame is indicating a rightward direction, updating the image so that the image is panned in the rightward direction; and
   in accordance with a determination that the configuration of the portion of the wearer in the target frame is not indicating in a leftward or rightward direction, forgoing updating the image.

8. The augmented-reality headset of claim 1, wherein the portion of the wearer is one or both eyes of the wearer.

9. A method, performed by augmented-reality headset, comprising:
   capturing, via a camera communicatively coupled to the augmented-reality headset, a target frame, wherein the target frame includes a portion of a wearer of the augmented-reality headset;
   generating, based on the target frame, a target feature embedding representing the target frame;
   identifying, from a stored set of embeddings that is distinct from the target feature embedding, a sample embedding that is closest to the target feature embedding and a sample calibration frame associated with the sample embedding, wherein the sample embedding is distinct from the target feature embedding and the sample calibration frame is distinct from the target frame;
   generating a combined embedding comprising a difference between the target feature embedding and the sample embedding;
   providing the target feature embedding, the combined embedding, and information about the sample calibration frame as inputs to a neural network that is trained to predict a difference between an input calibration frame and an input target frame;
generating, using the neural network, a predicted difference between the sample calibration frame and the target frame;
predicting, based on the predicted difference and the neural network, a configuration of the portion of the wearer image in the target frame; and
in accordance with a determination that the configuration of the portion of the wearer in the target frame is indicating a leftward direction, updating an image displayed at a display that is communicatively coupled to the augmented-reality headset so that the image is panned in the leftward direction.

10. The method of claim 9, wherein identifying the sample embedding that is most similar to the target feature embedding comprises determining the distance between the target feature embedding and each of the embeddings in the stored set of embeddings.

11. The method of claim 9, further comprising:
prompting a wearer of the augmented-reality headset to generate a set of calibration frames;
for each of the calibration frames generating, using a trained neural network, a feature embedding representative of the calibration frame;
storing each of the calibration frames in association with its feature embedding in a stored set of embeddings associated with the wearer; and
wherein the augmented-reality headset store a different set of calibration frame and associated set of embeddings for each wearer of the augmented-reality headset.

12. The method of claim 9, wherein training the neural network comprises:
providing a target training frame and a target calibration frame;
generating an embedding of the target training frame;
generating an embedding of the target calibration frame;
providing the embedding of the target training frame and the embedding of the target calibration frame to the neural network;
generating a prediction about the target training frame based on the output of the neural network;
comparing the target training frame to the prediction; and
adjusting weights of the neural network in response to the comparison.

13. The method of claim 8, wherein the imaging device system performs one of hand tracking, object tracking, face tracking, or eye tracking.

14. The method of claim 8, wherein the imaging device system performs hand tracking, wherein the neural network is trained to perform one of determining:
a classification of a left or right hand, a radius of a shape of a hand, or a center of a shape of a hand.

15. A computer program product comprising a non-transitory computer-readable storage medium containing computer program code that comprises executable instructions that, when executed, cause a processor to perform steps comprising:
capturing a target frame, wherein the target frame includes a portion of a wearer of augmented-reality headset;
generating, based on the target frame, a target feature embedding representing a target frame;
identifying, from a stored set of embeddings that is distinct from the target feature embedding, a sample embedding that is closest to the target feature embedding and a sample calibration frame associated with the sample embedding, wherein the sample embedding is distinct from the target feature embedding and the sample calibration frame is distinct from the target frame;
generating a combined embedding comprising a difference between the target feature embedding and the sample embedding;
providing the target feature embedding, the combined embedding, and information about the sample calibration frame as inputs to a neural network that is trained to predict a difference between an input calibration frame and an input target frame;
generating, using the neural network, a predicted difference between the sample calibration frame and the target frame; and
predicting, based on the predicted difference and the neural network, a configuration of the portion of the user in the target frame; and
in accordance with a determination that the configuration of the portion of the wearer in the target frame is indicating a leftward direction, updating an image displayed at a display that is communicatively coupled to the augmented-reality headset so that the image is panned in the leftward direction.

16. The computer program product of claim 15, wherein identifying the sample embedding that is most similar to the target feature embedding comprises determining the distance between the target feature embedding and each of the embeddings in the stored set of embeddings.

17. The computer program product of claim 15, the steps further comprising:
prompting the wearer to generate a set of calibration frames;
for each of the calibration frames generating, using a trained neural network, a feature embedding representative of the calibration frame; and
storing each of the calibration frames in association with its feature embedding in a stored set of embeddings associated with the wearer.

18. The computer program product of claim 15, wherein training the neural network comprises:
providing a target training frame and a target calibration frame;
generating an embedding of the target training frame;
generating an embedding of the target calibration frame;
providing the embedding of the target training frame and the embedding of the target calibration frame to the neural network;
generating a prediction about the target training frame based on the output of the neural network;
comparing the target training frame to the prediction; and
adjusting weights of the neural network in response to the comparison.

19. The computer program product of claim 15, wherein execution of the steps performs one of hand tracking, object tracking, face tracking, or eye tracking.

20. The computer program product of claim 15, wherein the neural network is trained to perform one of:
determining a classification of a left or right hand, determine a radius of a shape of a hand, or determine a center of a shape of a hand.

* * * * *